L. H. COLBORN.
Harvester Cutter.

No. 23,552.    Patented April 12, 1859.

Witnesses:
Cha Everett
Orly Tweedy

Inventor:
Lew. H. Colborn

UNITED STATES PATENT OFFICE.

LEVI H. COLBORN, OF BALTIMORE, MARYLAND.

IMPROVEMENT IN HARVESTERS.

Specification forming part of Letters Patent No. 23,552, dated April 12, 1859.

*To all whom it may concern:*

Be it known that I, LEVI H. COLBORN, of the city of Baltimore, in the county of Baltimore and State of Maryland, have made certain new and useful Improvements in Reaping and Mowing Machines; and I hereby declare that the following is a full, clear, and exact description thereof, reference being had to the accompanying drawings, making a part of this specification, in which—

Figure 1:
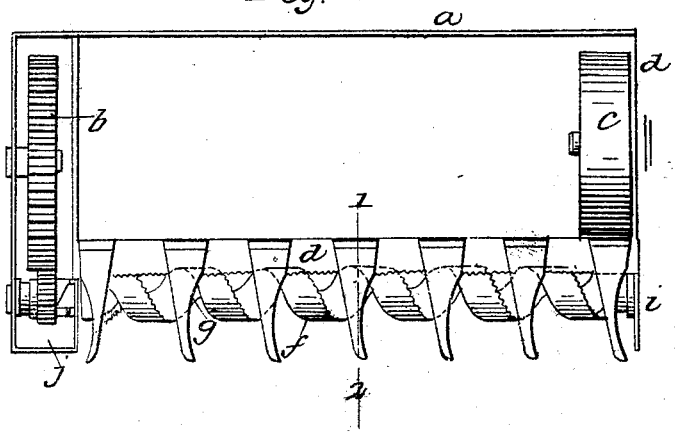
Figure 2:
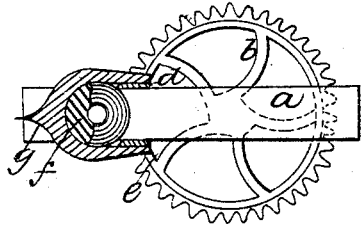
Figure 3:
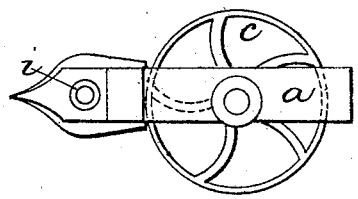
Figure 4:
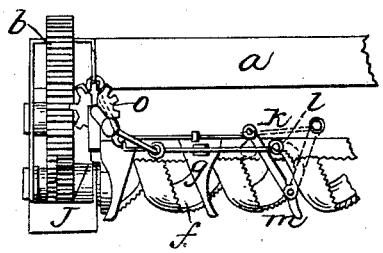

Figure 1 is a plan view of the cutting apparatus; Fig. 2, a transverse section in the line 1 2; Fig. 3, an end view of the cutter and end of the frame; Fig. 4, a front view of a portion of the machine, showing the vibrating guard; and Fig. 5, an end view of Fig. 4.

The letters of reference indicate the same parts in the different figures.

My improvements relate to the cutting apparatus of mowing and reaping machines.

The following is a description of the apparatus.

The frame A is supported upon the journals of the driving-wheel $b$ and the bearing-wheel $c$. It is composed of a back and two end pieces, the latter being connected in front by the top plate, $d$, and the bottom plate, $e$, extending horizontally across the machine.

The cutter $f$ is cylindrical in its general form, such as would be produced by winding a band flat upon its outer side round a mandrel, which is afterward withdrawn, leaving a continuous hollow space the whole length of the cutter. The spiral is pitched so as to leave spaces between its turns. Around the spiral thus formed a steel plate is fastened by welding or otherwise, and turned truly cylindrical. Its edge is sharpened and projects slightly on one side beyond the spiral band. This edge is the cutting-edge, and may be plain or serrated. The inner edges of the spiral are rounded off, as shown in the drawings. The spiral cutter revolves, when in action, in the direction of the dart through openings in the guards $g$, which are circular and fit close to the cylindrical cutter, giving a shearing cut between the edges of the cutters and the opposing edges of the openings. The edge of the cutter also comes in shearing contact with the edge of the upper bar or plate, $d$, which may be plain or serrated. Thus every portion of the cutting-edge of the knife is made to pass in one direction with a continuous drawing cut in contact with the guards $g$ and upper plate, $d$, which also pass over the whole cylindrical surface and keep it clear. The center of the spiral being open in its whole length, there is nothing around which grass or straw can wind to obstruct the machine. Should any straws by any defect in adjustment pass the guard or the top plate without being cut in one revolution, it is almost certain to be cut upon the next, while anything that may accumulate between the two end guards will be pushed through the hollow journal $i$, the opening in which is a continuation of that which extends through the whole length of the spiral. The lower bar, $e$, is also in close proximity to the periphery of the cutter, the edge of which keeps it clear by drawing any accumulation from it. The knife or cutter receives its motion from the driving-wheel meshing into the wheel $j$, which is thrown in or out of gear by means of a clutch.

Figure 5:

Figs. 4 and 5 represent a substitute for the upper portion of the guard. It consists of two arms, $k$ and $l$, pivoted at $m$, which receive a vibrating motion by means of connecting-rods which are attached to cranks placed opposite to each other upon the shaft of a toothed wheel, O, which meshes into teeth upon the driving-wheel. The edge of one of these arms, which may be serrated, meets the cutting-edge of the knife.

I do not confine myself to any particular dimensions or pitch of the spiral.

What I claim as my invention, and desire to secure by Letters Patent, is—

The spiral revolving cutter constructed and arranged, substantially as described, with a continuous opening through its center, for the purpose specified.

LEVI H. COLBORN.

In presence of—
 CHAS. EVERETT,
 OVT. TWF DS.